A. C. EASTWOOD.
POWER GENERATING AND DISTRIBUTING SYSTEM.
APPLICATION FILED MAY 7, 1908.
930,363.
Patented Aug. 10, 1909.
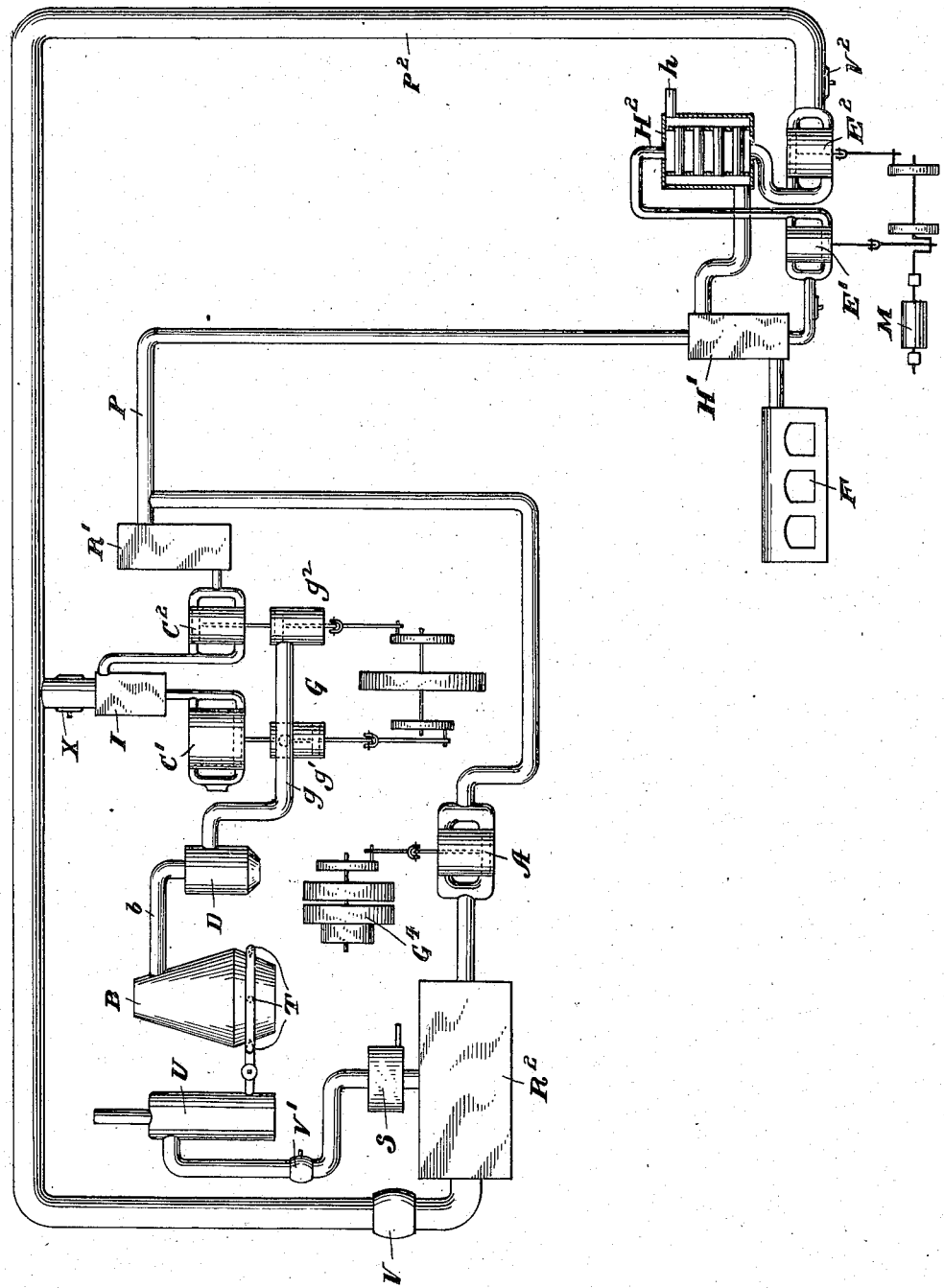
WITNESSES:
INVENTOR
A. C. Eastwood
by F. N. Barber
ATTORNEY

UNITED STATES PATENT OFFICE.

ARTHUR C. EASTWOOD, OF CLEVELAND, OHIO.

POWER GENERATING AND DISTRIBUTING SYSTEM.

No. 930,363.        Specification of Letters Patent.        Patented Aug. 10, 1909.

Application filed May 7, 1908. Serial No. 431,478.

*To all whom it may concern:*

Be it known that I, ARTHUR C. EASTWOOD, a citizen of the United States, residing at Cleveland, in the county of Cuyahoga and State of Ohio, have invented or discovered new and useful Improvements in Power Generating and Distributing Systems, of which the following is a specification.

My invention relates to the generation and distribution of power in metallurgical works, particularly in works devoted to the manufacture of iron and steel.

The objects of my invention are first, to generate power at maximum efficiency; second, to distribute and utilize power at maximum efficiency and minimum cost; third, to apply to useful purposes heat energy which is at present wasted in metallurgical works; fourth, to provide a dry blast for blast furnaces, thereby reducing the amount of heat required to heat the blast and also reducing the fuel consumption in the furnace; and fifth, to provide a power generating and distributing system which can readily be applied to existing plants without excessive expense and with a large saving in fuel.

It has been demonstrated that the waste gases from a blast furnace can be efficiently used as fuel in a gas engine and that a blast furnace will ordinarily emit sufficient gas not only to provide power for compressing air for its own blast but there will be a very large surplus of gas which may be used for generating power for other purposes. In a metallurgical plant, embracing not only a blast furnace or furnaces but also mills for finishing the product, the surplus gas may be efficiently used in generating power for carrying on the finishing processes, particularly in driving the mills for rolling the product into the required shapes. In the majority of existing plants the finishing mills are driven by steam engines, frequently of several thousand horse-power, which of course entail a heavy expense for fuel.

Where gas engines have been installed to convert into power the surplus waste gases from the blast furnace, so far as I am aware, they have invariably been used to drive electric generators which in turn furnish power for the various finishing machinery. Electric power is, of course, ideal for cranes, conveyers and like machinery and is also particularly applicable to large motors running constantly in a given direction. Particular difficulty, however, is met with in applying electric power to the driving of reversing mills, which ordinarily require a very large amount of power and which must be frequently and rapidly reversed. The electrical equipment for this purpose, as at present developed, is excessively expensive, somewhat complicated and its satisfactory operation is yet somewhat problematical.

On account of the great cost of the electrical equipment and the fact that to apply it steam engines of perhaps several thousand horse-power must be thrown out of service, the utilization of waste blast furnace gas in most existing plants becomes prohibitive. By means of my invention these difficulties are overcome. Power derived from the combustion of surplus blast furnace gas in gas engines may be utilized for driving the heaviest reversing mills, and this without excessive cost or complication. In fact, the steam engines now in place for driving such mills in existing plants can be utilized to advantage. Again it has been found in practice that a blast furnace will operate with a consumption of less fuel in dry cold weather than that required when the air is more heavily laden with moisture and that considerable saving in fuel has been realized by artificially removing moisture from the blast delivered to the furnace.

My invention embraces means whereby moisture can be removed from the blast with exceptional economy and with a minimum amount of additional or auxiliary apparatus. In carrying out my invention I provide gas or internal combustion engines adapted to use waste gases from the blast furnace as fuel. The gas engines are arranged to drive air compressors, compressing air preferably in two or more stages, the first stage preferably bringing the air to the maximum pressure required in blowing the furnace, which, in accordance with present practice, would be about thirty pounds gage pressure per square inch. The compression is carried on isothermally as far as practicable, inter-coolers being provided between the stages. The final stage of compression preferably brings the air to working pressure, say 150 to 200 pounds per square inch. In cases, however, in which the compressed air must be transmitted to considerable distances it may be compressed and transmitted at a higher pressure and this pressure reduced at the point of use.

I transmit the compressed air through suitable pipes to the finishing mills. At the mills I provide reheaters for heating the air before use in the mill-engines. At the mills soaking-pits or heating furnaces are customarily provided for bringing the iron or steel to the requisite temperature before rolling. Owing to the high degree of heat required, the gases of combustion, after heating the pits or furnaces, are customarily liberated into the stack at a high temperature. In carrying out my invention I preferably use the gases of combustion from the soaking pits or heating furnaces to reheat the compressed air. In existing plants where the mills have been driven by steam engines the boilers may be used as reheaters, their capacity serving as a reservoir or receiver for the compressed air. As can be readily demonstrated, the proper reheating of the air will permit of realizing approximately double the power which could be developed without reheating. Not only can the normal losses of transmission be made up but more power can be developed than has actually been expended in compressing the air. The heat absorbed in the process of reheating may be converted into mechanical work at a very high efficiency and, in using for the purpose heat which is ordinarily wasted, I provide means for securing a large augmentation of power at a trifling cost.

For driving the mills I provide compressed air engines for which purpose, in existing mills, the present steam engines may be employed, thus making it possible to realize the advantages of using surplus blast-furnace gas for power purposes without excessive alteration or cost of installation. In the case of continuously running mills, such as "three-high mills", the compressed air may be used expansively. Preferably the engine will be compound and the air reheated before entering the high pressure cylinder and again reheated before passing into the low pressure cylinder. In the case of reversing mills such as "blooming-mills", where large variations in speed as well as frequent reversals are required the engine must be governed by throttle as well as by cut-off. In such cases I provide a return or exhaust line from the engine to the blast-furnaces and utilize the exhaust from the engine for furnishing the blast for the furnaces, the exhaust being passed through a reducing valve to bring it to the requisite blast pressure.

In applying my invention to existing plants where steam engines are to be converted into air engines a by-pass will be provided, by means of which the engine may be permitted to exhaust into the atmosphere and be thus relieved of back pressure at times when the maximum power of the engine is required.

At or near the blast-furnaces I provide a receiver of the requisite capacity for storing a reserve of compressed air for blowing the furnaces. I preferably store this air at the maximum pressure required in blowing the furnaces and reduce its pressure by reducing valves to meet variations in the working of the furnaces. When sufficient exhaust from the mill engines is not available for blowing the furnaces, I draw upon the air compressed in the first stage of compression, which, as previously noted, will be preferably at the maximum pressure required for the blast.

To remove moisture from the blast, I take a portion of the high-pressure air, and permit it to expand adiabatically in a cylinder behind a piston which may be arranged to assist in the compression of further air or may be arranged to perform other useful work, such for instance as driving an electric generator. I expand the air in this way to a point at or slightly above the maximum blast pressure and then exhaust it into the air for the blast. The adiabatic expansion of the air reduces it to a low temperature and by exhausting this air into and therefore mixing it directly with the blast, the blast is effectively chilled and a large part of the moisture which it carries may then be condensed. This condensed moisture I separate from the air by suitable means, such as a centrifugal separator.

Since the refrigerating agent is exhausted directly into the blast and adds to the volume of the blast the cooling action will be effective owing to the intimate commingling of the cold air exhaust with the blast and the efficiency will be high since the exhaust performs useful work in assisting in blowing the furnace.

In the accompanying drawing I have illustrated my invention diagrammatically since the invention does not relate to the details of the apparatus employed.

In the drawing, B is a blast furnace. The gases emitted from the furnace are led through the pipe "$b$" to the dust-catcher "D", in which the dust is removed from the gas. The gas is then conveyed through the pipe "$g$" to the cylinders $g'$ and $g^2$ of a gas engine "G" and serves as fuel for the engine. The gas engine drives an air-compressor having cylinders $C'$ and $C^2$, $C'$ being the low pressure cylinder in which the first stage of compression is carried on and $C^2$ the high pressure cylinder. The air may be compressed in more than two stages if necessary. "I" is an inter-cooler through which the air passes between the stages of compression. In the inter-cooler the heat due to the compression is removed by water or other cooling agents so as to render the compression as nearly isothermal as possible.

From the high pressure cylinder, $C^2$, the air passes to a receiver $R'$. A pipe line P is connected to the receiver and serves to conduct the compressed air to the points of use. In the diagram I have shown the pipe-line extending to a mill-engine E driving a finishing mill M. F is a soaking pit or heating furnace used for bringing the iron or steel to the proper temperature for rolling. The gases of combustion from the furnace F are conducted to a reheater $H'$ in which they pass through suitable tubes or flues. The gases are then conducted through similar tubes or flues in a second reheater $H^2$ and then pass into the air through the stack $h$. The compressed air before entering the high pressure cylinder $E'$ of the engine E passes through the reheater $H'$. The exhaust from the high pressure cylinder $E'$ passes through the reheater $H^2$ before entering the low pressure cylinder $E^2$. The exhaust from the low pressure cylinder $E^2$ passes through the pipe $P^2$ to the receiver $R^2$.

V is a reducing valve through which the air passes before entering the receiver $R^2$.

A is an air engine which I have indicated as driving an electric generator $G^4$. This generator may furnish current for operating electric cranes, conveying tables and other machinery used in handling and finishing the product of the blast-furnace. Compressed air after working expansively in the cylinder of the engine A is exhausted into the receiver $R^2$. This exhaust, due to adiabatic expansion, will be at a low temperature and will chill the air in the receiver causing a large portion of the water vapor which it carries to condense. The condensed moisture is removed by a separator S.

$V'$ is a regulating valve through which the blast passes to the stoves U, in which it is heated before entering the furnace through the twyers T.

X is a connection between the low-pressure receiver or inter-cooler I and the receiver $R^2$ through which air may be conducted in case sufficient exhaust from the mill-engines is not available for furnishing the requisite blast for the furnaces.

$V^2$ is a relief valve in the exhaust pipe $P^2$ from the engine E which may be opened, permitting the exhaust to escape into the atmosphere at times when the maximum power of the engine is required.

I claim—

1. In a metallurgical plant, a blast-furnace, a gas-engine arranged to use the waste gas from the blast-furnace for fuel, an air-compressor driven by the gas engine, a mill, a compressed air engine for driving the mill, and means for leading the air from the compressor to the air engine for the operation of the latter.

2. In a metallurgical plant, a finishing mill, a compressed air engine for driving the mill, a heating furnace, an air heater in the path of the compressed air to air engine, and means for leading the waste gases of said heating furnace to the air heater.

3. In a metallurgical plant, a blast-furnace, a gas-engine arranged to use the waste gas from the blast-furnace for fuel, an air-compressor driven by the gas-engine, a mill, a compressed air engine for driving the mill, means for leading the air from the compressor to the air-engine for the operation of the latter, a heating furnace, an air heater in the path of the compressed air to the air-engine, and means for leading the waste gases from said heating furnace to the air heater.

4. In a metallurgical plant, a blast-furnace, a gas engine arranged to use the waste gas from the blast-furnace for fuel, an air compressor driven by the gas engine, means for leading the compressed air to the blast-furnace for blowing the same, mechanism for treating the product of the blast-furnace, and a compressed air engine operatively connected to said mechanism and deriving compressed air from the compressor.

5. In a metallurgical plant, a blast-furnace, an air engine driven by compressed air, and means for leading the exhaust of the engine to the blast-furnace for blowing the same.

6. In a metallurgical plant, a blast-furnace, a gas-engine arranged to use the waste gas from the blast-furnace for fuel, an air-compressor driven by the gas-engine, a mill-engine actuated by air from the compressor, and means for leading the exhaust of the engine to the blast-furnace for blowing the same.

7. The combination of a blast furnace, a gas engine arranged to use the waste gas from the blast furnace for fuel, an air compressor driven by the gas engine, a mill, a reversing compressed air engine connected for driving said mill, and means connecting the air compressor to the air engine.

Signed at Cleveland, Ohio, this 4th day of May, A. D., 1908.

ARTHUR C. EASTWOOD.

Witnesses:
H. M. DIEMER,
C. PIRTLE.